Dec. 19, 1967     H. L. GROGINSKY     3,359,442
AZIMUTH ANGLE ESTIMATOR

Filed April 1, 1966     3 Sheets-Sheet 1

INVENTOR
HERBERT L. GROGINSKY
BY Carole M. Calman
ATTORNEY

Dec. 19, 1967     H. L. GROGINSKY     3,359,442
AZIMUTH ANGLE ESTIMATOR
Filed April 1, 1966     3 Sheets-Sheet 2
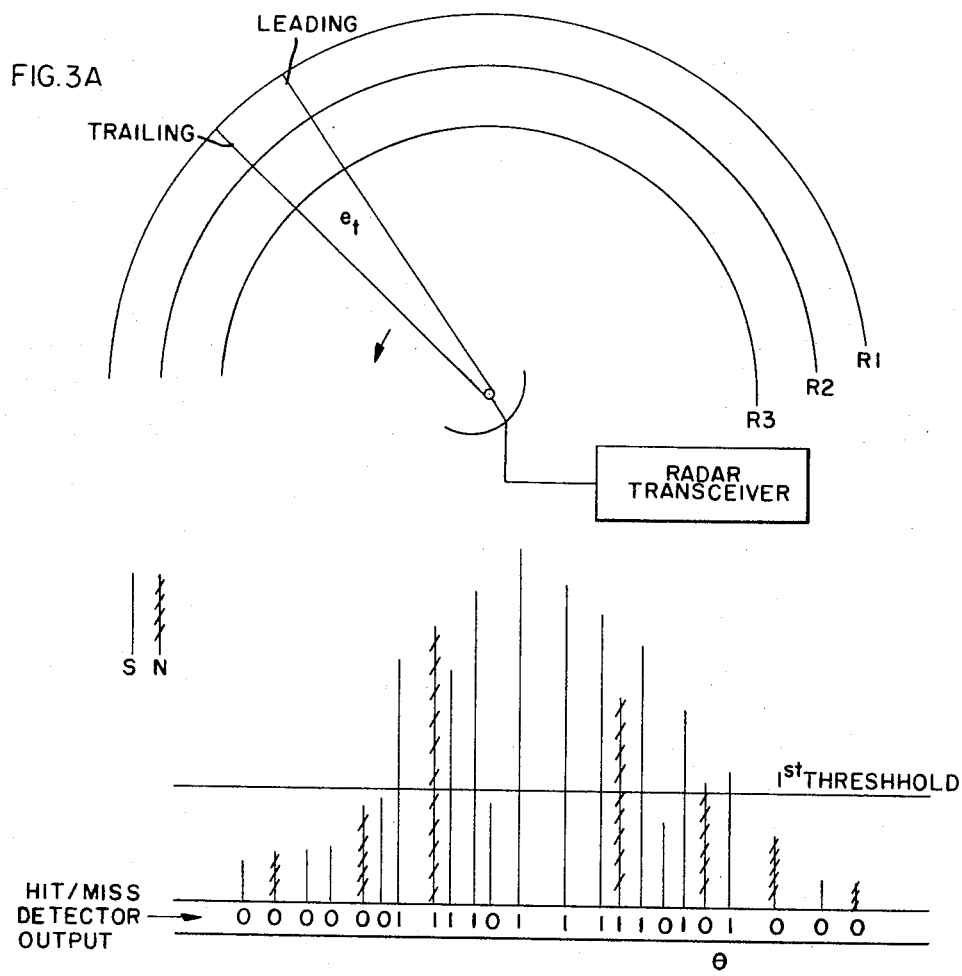
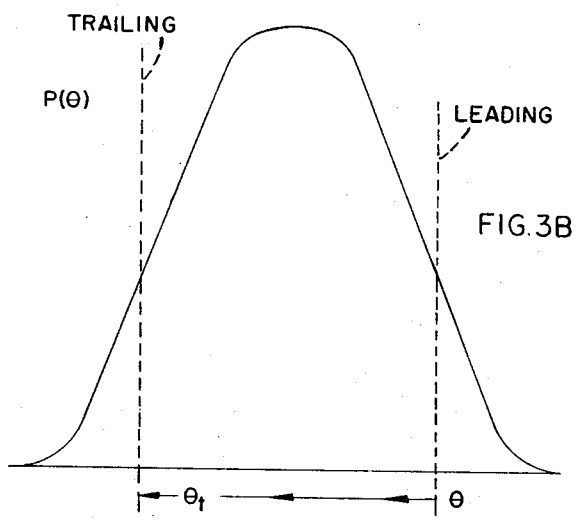
INVENTOR.
HERBERT L. GROGINSKY

INVENTOR
HERBERT L. GROGINSKY

United States Patent Office 3,359,442
Patented Dec. 19, 1967

3,359,442
AZIMUTH ANGLE ESTIMATOR
Herbert L. Groginsky, Sudbury, Mass., assignor to Raytheon Company, Lexington, Mass., a corporation of Delaware
Filed Apr. 1, 1966, Ser. No. 539,502
2 Claims. (Cl. 343—16)

ABSTRACT OF THE DISCLOSURE

An apparatus for estimating the target angle location within a radar beamwidth responsive to radar return signals representative of target hits and misses. The apparatus in combination with an azimuth angle calculator uses a reversible counter operable between an upper and lower count. In response to each target hit, circuitry increments the count by a predetermined amount. In response to each target miss additional circuitry decrements the count by another predetermined amount. A first signal is generated when the count equals the upper count and a second signal is generated when a count equals the lower count. Such first and second signals define respectively the leading and lagging edges of the radar beam. A split may be defined by use of a second counter counting at half the radar pulse repetition rate in response to the first signal and terminating in response to the second signal.

Background of the invention

This invention relates to improvements in apparatus used in combination with an azimuth angle calculator responsive to radar return signals representative of target hits and misses for estimating the target angle location within a radar beamwidth.

It is known that the estimation of the target angle location within a beamwidth is dependent upon the detection of the leading and trailing edges of the radar beam. In the prior art, as for example U.S. Patent No. 3,235,867 issued Feb. 15, 1966 to W. D. Wirth, a leading edge test is implemented using a counter and a detection logic. This counter logic declares a target to be present if and only if a fixed number of consecutive target hits above a threshold are received. At this point the counter is then reset and the test reapplied. This prior art system does not take into account the interspersing of target misses among target hits. This bias variation can be substantial.

Additional examples of the attempts to use counterlogic exhibiting similar disadvantages as that shown in the Wirth reference may be found, for instance, in the Sperry Engineering Review, vol. 15, No. 3, at pages 12 and 22.

It is accordingly an object of this invention to devise an apparatus in combination with an azimuth angle calculator for estimating the target angle location within a radar beamwidth.

It is another object of this invention to devise an apparatus using counterlogic requiring less circuit complexity and information storage requirements without sacrificing sensitivity and accuracy.

Summary of the invention

The invention is realized in combination with an azimuth angle calculator in which an apparatus responsive to radar return signals representative of target hits and misses estimates the target angle location within a radar beam using a reversible counter operable between an upper and lower count. Circuits responsive to each target hit increment the count by a predetermined amount and are also responsive to each target miss for decrementing the count by another predetermined amount. Additional circuitry coupling the counter and the incrementing circuits to the azimuth angle calculator generates a first signal each time the count equals the upper count and a second signal each time the count equals a lower count.

Advantageously both the leading and lagging beam edges can be defined. Furthermore, a count is taken of target misses as well as target hits, avoiding the bias of the prior art apparatus.

The target angle may be more precisely defined between the leading and lagging beam edges by the use of a second counter interposed between the signal generating circuitry and the azimuth angle calculator. The second counter counts at half the radar pulse repetition frequency in response to each first signal. The count is terminated in response to a second signal.

Significantly, the apparatus is responsive to changes occurring after the leading edge has been detected. Such a capability was not available in prior art counter arrangements.

It should be noted that when the upper count is reached, additional target hits do not cause a change in the count. However, a target miss does cause a reduction in the count. Similarly, at the lower count a target hit will increase the count while a target miss does not change the count. A target is detected and the leading edge is found whenever the reversible counter has reached the upper count. At that time the second counter begins to count at half the radar pulse repetition frequency. Subsequently, when the reversible counter falls below to the lower count the trailing edge is defined. The second counter is then stopped in response with the "split difference between the leading and lagging edges of the beam." This count is transmitted to the azimuth angle calculator.

Brief description of the drawings

FIG. 3a is an idealized radar beam with range rings superimposed;

FIG. 3b shows a power spectrum as a function of a received radar beam of width $\theta$ in the absence of noise;

FIG. 3c shows received radar return signals in the presence of noise;

Description of the preferred embodiment

In order to provide a clear understanding of the invention a description of FIGS. 3a through 3c will be stated first.

FIG. 3a shows an idealized radar and antenna of beamwidth $\theta_T$ rotating in a counterclockwise direction. Radar ranges $R_1$, $R_2$ and $R_3$ are superimposed to indicate that targets may be located at varying ranges from the radar. For purposes of the subsequent discussion it will be assumed that the return target signals reference a target whose range is constant.

The leading edge of the radar beam is defined as a first azimuth angle at which the number of radar return target hits is equal to a first number. The trailing edge is defined as a second azimuth angle at which the number of radar return target hits equals a second number.

FIG. 3b shows a power spectrum of radar return signals from a target in the absence of noise as a function of beamwith. As is well known, the maximum power is reflected at the beam center between the leading and trailing edges.

FIG. 3c shows radar return signals embedded in noise as a function of beamwidth $\theta$. Displayed is the arbitrary threshold level above which signals or noise are quantized as one and below which signals or noise are quantized as zero. The output of a radar receiver HIT/MISS detector is represented immediately below the discrete spectrum.

Figure 1:
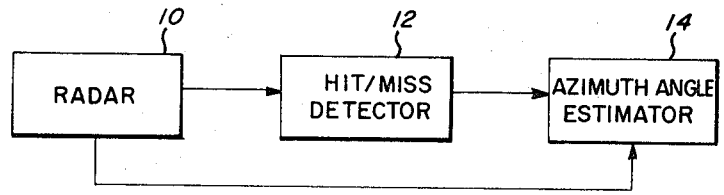
FIG. 1 shows a block diagram of the apparatus in a radar system having a hit and miss detector.

FIG. 1 shows a radar system in which a hit and miss detector 12 responsive to radar return signals is interposed between the radar receiver 10 and an azimuth angle estimator 14. The raw radar video signals are applied to the hit and miss detector for determining which video signals correspond to target hits and which correspond to target misses. The raw radar video is also applied to the azimuth angle estimator to correlate the successive angular values for each radar sweep. The hit and miss detector includes range estimation and gating devices for determining the range represented by the video signal and threshold detectors for distinguishing between hits and misses. Such a system may be seen, for example, in the Sperry Engineering Review, volume 15, No. 3, Winter, 1962, on FIG. 4 at page 13. The azimuth angle estimator 14, thus receives a plurality of binary signals representative of target hits and misses and from this data determines the azimuth angle of a target present in any particular range area.

Since the invention relates to improvements in apparatus for estimating the target angle location within a radar beamwidth it is necessary to provide structure for ascertaining the leading and trailing edges of the beam. One type of prior art structure is illustrated in U.S. Patent 3,235,867 issued Feb. 15, 1966, to W. D. Wirth.

Figure 3D:
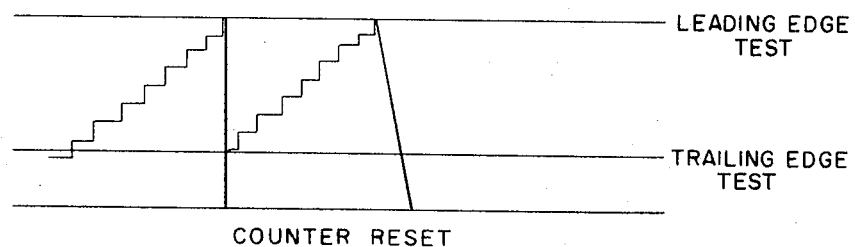
FIG. 3d shows the prior art counterlogic behavior.

FIG. 3d shows the counter-logic behavior of this prior art device. Radar return target hits are counted up to a predetermined upper count with the counter being reset. Thus, only a leading edge test is applied.

Figure 2:
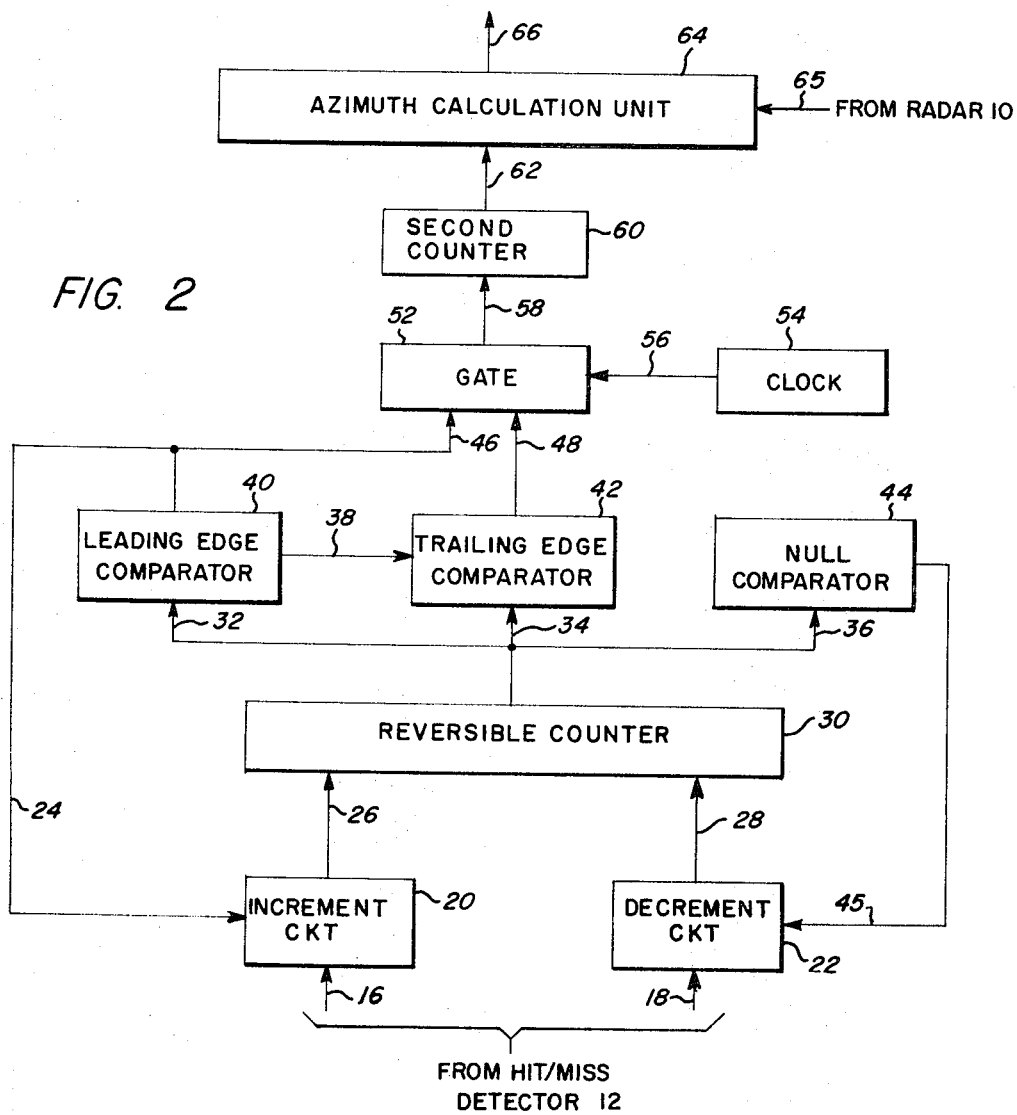
FIG. 2 is a more detailed block diagram of the invention emphasizing the counterlogic.

FIG. 2 is a detailed block diagram showing the apparatus of the invention in combination with an azimuth calculator. A reversible counter 30 is normally operable between an upper count stored in leading edge comparator 40 and zero stored in null comparator 44. A first signal is normally generated by leading edge comparator 40 each time the count in reversible counter 30 reaches the upper count. Similarly, trailing edge comparator 42 generates a second signal each time the count in reversible counter 30 is equal to a low count stored in the trailing edge comparator. Use of boundary comparators in combination with reversible counters is known in the art and may be seen, for example, in FIG. 1 of U.S. Patent 3,235,867. Signals from the hit and miss detector 12 representing target hits and target misses are respectively applied to increment circuit 20 and decrement circuit 22. The increment circuit increases the count in reversible counter 30 over conductor 26 by a predetermined amount upon receipt of a target hit signal. Likewise, the decrement circuit 22 decreases the count in reversible counter 30 over conductor 28 by another predetermined amount each time a target miss signal from the hit/miss detector 12 is received. Circuits for incrementing and decrementing a reversible counter are well known to the art and shown, for example, in U.S. Patent 3,171,119, FIGS. 3 and 4.

A clocked gating arrangement including gate 52 is interposed between the leading edge and trailing edge comparators 40 and 42 and a second counter 60. This counter is set to count at one-half of the radar pulse repetition frequency. It is initiated upon application of the first signal from leading edge comparator 40 over line 46 through gate 52. The count is terminated upon a second signal from the trailing edge comparator 42 applied through gate 52 on conductors 48 and 58. The trailing edge comparator 42 is normally inhibited from generating the second signal by a bias applied by the ring edge comparator 40 on lead 38. This bias is removed once the leading edge comparator has generated a first signal and is reapplied after generation of the second signal. In a similar manner, the null comparator 44 determines when the zero count is reached by the reversible counter 30 by comparing the count with its own stored setting. When they are equal, the null comparator 44 applies an inhibit signal via line 45 to the decrement circuit 22.

When leading edge comparator 40 applies a first signal to line 46, gate 52 opens and transfers the clock pulses from clock 54 to second counter 60. This initiates the count. If the pulse repetition frequency of clock 54 is one-half that of the radar 10, the second counter steps one count for every two sweeps of the radar. A signal received on line 48 from the trailing edge comparator 42 closes gate 52 and the count stored in the second counter 60 designates the midpoint between the leading and trailing edges.

Figure 3E:
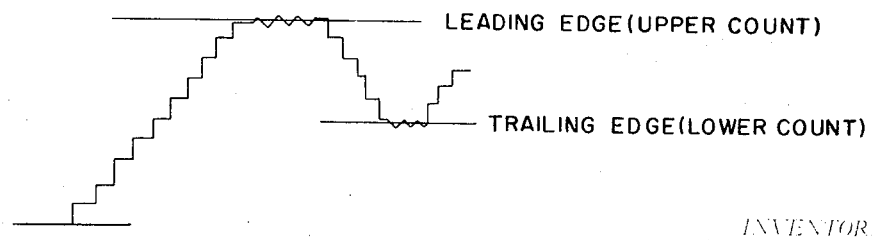
FIG. 3e shows the counter-logic behavior according to the invention.

FIG. 3e shows the reversible counter behavior demonstrating that once the count equals the upper count it will remain at that setting irrespective of additional target hits. Any target misses will cause an immediate decrement of the count. The counter logic of the invention may be set to more accurately follow the statistical central tendency of the received target hits and misses than the counter logic of the prior art.

Figure 4:
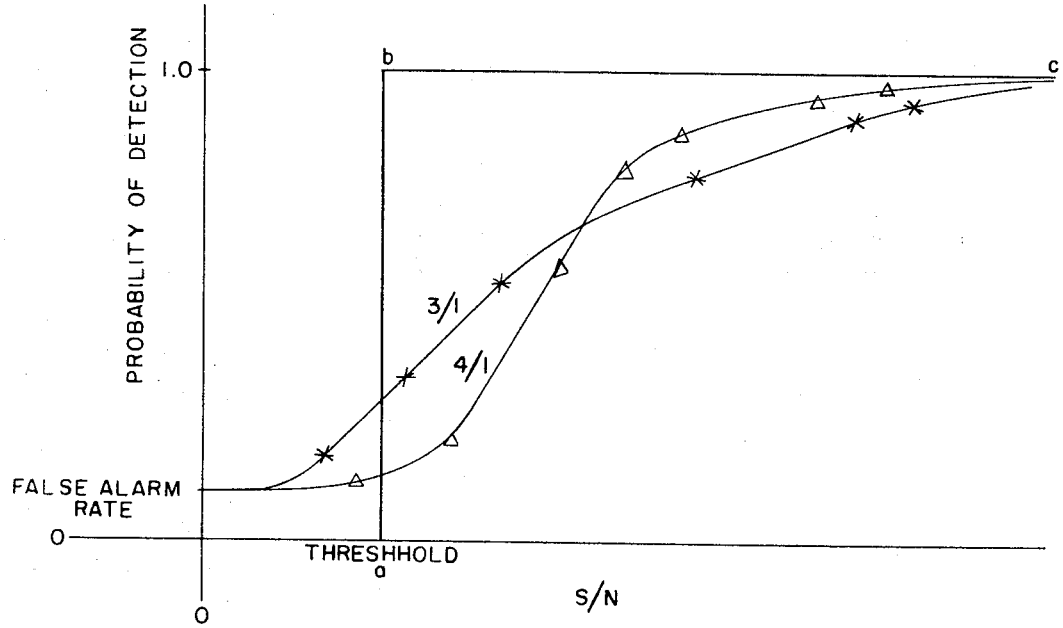
FIG. 4 shows the operating characteristic function of the counter-logic emphasizing the behavior of variations in the up/down count.

FIG. 4 shows the operating characteristic function plotted as the probability of detection versus the signal-to-noise ratio. The ideal counter logic behavior is represented by lines abc. For a given false alarm rate an up-down count of three to one was a better compromise for the ideal than an up-down count rate of four to one. Other up-down count rates five to one, three to two, etc., did not materially differ in their characteristic from the two up-down count rates draft in the figure.

As was stated before, azimuth calculation unit 64 receives the count stored in counter 60 when comparator 42 locates the lagging edge as well as a binary number from radar 10 designating the azimuth angle at that time minus a bias value which depends upon the upper boundary divided by the hit count. Azimuth calculation unit 58 may comprise any well-known arithmetic unit for calculating the correct azimuth angle and generating its value on line 66 by adding the count received from counter 60 to the angle corresponding to the lagging edge that was received from radar 10. Thus, this invention determines which sequence of signals signifies that a target is present, rejecting those signals due to noise only. When a target is found, it makes a best guess as to where the center of the target is relative to the sequence of hits obtained.

A brief mathematical explanation for the invention will now be given to aid in its understanding. At the output of hit/miss detector 12 for each range, there appears a sequence of digital hits or misses. Classical detection theory shows that the optimum way to process such data, if the system is allowed to examine only a finite sequence of hits, is to compute the likelihood ratio, $$L = \frac{p(S+N/x)}{p(N/x)}$$

where:

$p(S+N/x)$ = probability that there is a target present in the radar beam given the sequence of hits and misses $x_i = 0, 1$; $x = (x_1 \ldots x_m)$ which was observed.

$p(N/x)$ = probability that the radar input is noise alone given the observations $x$.

A target is declared to be present whenever the likelihood ratio exceeds a predetermined threshold quantity. If the radar beam is substantially rectangular and successive hits and misses are statistically independent, $$L = \frac{p(S)\prod_{k=1}^{m} p_n^{x_k}(1-p_n)^{1-x_k}}{p(N)\prod_{k=1}^{m} p_o^{x_k}(1-p_o)^{1-x_k}}$$

where:

$x_k = \begin{cases} 1 \text{ if the } k^{th} \text{ sample was a hit} \\ 0 \text{ if the } k^{th} \text{ sample was a miss} \end{cases}$ $p_n$ = probability of detecting a hit when a single is present
$p_o$ = probability of detecting a hit when noise alone is present
$p(S)$ = a priori probability that a target is present at the radar input
$p(N) = 1 - p(S)$ = a priori probability that noise only is present.

Now if instead of L, $\lambda = \log L$ is used, the function to be computed is, $$\lambda = \log L = \log \frac{p(S)}{p(N)} + \log \frac{p_n}{p_o} \sum_{k=1}^{N} x_k - \log\left(\frac{1-p_o}{1-p_n}\right) \sum_{k=1}^{N}(1-x_k)$$

The foregoing equation shows that for optimum results the invention counts up by an amount $\log (p_n/p_o)$ when a hit is observed and down by $\log [(1-p_o)/(1-p_n)]$ when a miss is observed. For example, if $p_o = 0.04$ and $p_n = 0.50$, and if log is taken to the base 2, an optimum system would count up by 3.6 and down by 1. From further considerations, it can be shown that only the ratio of these two numbers is important and that the invention is rather insensitive to this ratio.

The last equation demonstrates yet another important point, connected with the estimator bias quantity $\log [p(S)/p(N)]$, which affects the operation of the invention. Before a target has been observed $p(S)$ is very small; hence, the initial setting of accumulator 30 must be very close to the lower boundary. Following the detection of a target, $p(S)$ is nearly one, and thus the initial count commencing thereafter must be set very near the upper boundary.

Consider now the more general problem of the invention which counts up by $a$ and down by $b$. Defining the output signal-to-noise ratio as $$(S/N)_{out} = \frac{[\text{change in mean output when signal is present}]^2}{\text{variance of estimator output when noise alone is present}}$$

and accordingly $$(S/N)_{out} = \frac{\sum_{k=1}^{m}(p_n(\theta_k) - p_o)^2}{mp_o(1-p_o)}$$

where $p_n(\theta_k)$ = hit probability at the angle $\theta_k$ in the beam.

This equation indicates that the output signal-to-noise ratio is completely independent of the numbers used for the up and down counts, and that the invention is relatively insensitive to the up/down count ratio.

As was stated previously, before a target has been observed $p(S)$ is very small so that the initial setting of accumulator 30 must be very close to the lower boundary. Hence, accumulator 30 is initially set at a zero count or, in other words, at the lower boundary.

The upper boundary is selectively set to a value which depends upon the width of the radar beam and the level of the threshold detector (not shown) in hit/miss detector 12. After the target is detected, the priori detection probability is no longer the very small number set into reversible counter 30 before the target was detected and in fact is nearly one. For this case, the initial count after finding the leading edge must be set very near the upper boundary and to further simplify the invention, is set at the upper boundary or leading edge.

The trailing edge is marked by the count in accumulator 30 crossing a second threshold in the negative direction. That threshold must be selectively set in such a way that an intolerable number of false reports are not generated. At the trailing edge, false reports correspond to target splits. Consequently, the second threshold is chosen at the highest level not yielding an intolerably large number of splits.

Accordingly, this invention receives a sequence of binary digits from hit/miss detector 12, determines if a target is present, and then calculates where the center of the target is located. This is accomplished by selectively shifting a stored count in accordance with the received digits from detector 12 in order to find the leading and lagging edges of the target, determining the mean between these edges, and adding this mean to the angular value received from radar 10 designating the lagging edge. Since each binary digit from detector 12 corresponds to a different azimuth angle, locating the target center within the sequence of digits yields the desired azimuth angle.

In order to prevent undue burdening the description with matter within the knowledge of those skilled in the art, a block diagram approach has been followed with a detailed functional description of each block and specific identification of the circuitry it represents. The individual is free to consult any of the available treatises for a detailed description of these well-known circuits.

It should be appreciated that the invention is not limited to the preferred embodiment described herein since many variations thereof would be readily apparent to one skilled in the art. For instance, any well-known multiplexing techniques could be used in order to handle data from more than one range. Accordingly, the invention encompasses the full scope of the following claims.

What is claimed is:

1. In combination with an azimuth angle calculator, an apparatus responsive to radar return signals representative of target hits and misses for estimating the target angle location within a radar beamwidth comprising:
   a reversible counter operable between an upper and lower count;
   means responsive to each target hit for incrementing the count by a predetermined amount and responsive to each target miss for decrementing the count by another predetermined amount; and
   circuitry coupling the counter and incrementing means to the azimuth angle calculator for generating a first signal each time the count equals the upper count and a second signal each time the count equals the lower count.

2. In combination with an azimuth angle calculator, an apparatus responsive to radar return signals representative of target hits and misses for estimating the target angle location within a radar beamwidth comprising:
   a reversible counter operable between an upper and lower count;
   means responsive to each target hit for incrementing the count by a predetermined amount and responsive to each target miss for decrementing the count by another predetermined amount;
   means coupling the reversible counter and the incrementing means for generating a first signal each time the count equals the upper count and a second signal each time the count equals the lower count; and a second counter connecting the azimuth angle calculator and including means responsive to each first signal for counting at a rate equal to one-half the radar pulse repetition frequency and further responsive to each second signal for terminating the count.

References Cited

UNITED STATES PATENTS

| | | | |
|---|---|---|---|
| 3,171,119 | 2/1965 | Nuese et al. | 343—5 |
| 3,235,867 | 2/1966 | Wirth | 343—5 |
| 3,286,258 | 11/1966 | McQueen | 343—5 |

OTHER REFERENCES

Skolnik: Radar System, McGraw-Hill (1960), pp. 480–482.

Krantz et al.: "A Survey of Digital Methods for Radar Data Processing," Proc. of the Eastern Joint Computer Conf., December 1960, pp. 70, 76 and 77.

Walter et al.: "Comparative Evaluation of Several Azimuth Estimating Procedures Using Digital Processing and Search Radar Simulation," IRE Trans. ANE, June 1958, pp. 114–121.

RODNEY D. BENNETT, *Primary Examiner.*

C. L. WHITHAM, *Assistant Examiner.*